United States Patent [19]

Philpott

[11] Patent Number: 4,557,307

[45] Date of Patent: Dec. 10, 1985

[54] PNEUMATIC TIRE

[75] Inventor: Frank Philpott, Kuala Lumpur, Malaysia

[73] Assignee: The Goodyear Tire & Rubber Company, Akron, Ohio

[21] Appl. No.: 584,284

[22] Filed: Feb. 27, 1984

[51] Int. Cl.$^4$ .................. B60C 15/04; B29D 30/48
[52] U.S. Cl. .................................. 152/539; 152/374; 152/548; 156/136; 156/422; 245/1.5
[58] Field of Search .......... 152/362 R, 362 CS, 374; 156/136, 422, 460; 245/1.5

[56] References Cited

U.S. PATENT DOCUMENTS

| | | | |
|---|---|---|---|
| 780,209 | 1/1905 | Von Lüde | 152/399 |
| 1,498,532 | 6/1924 | Ambler | 152/362 R |
| 1,536,080 | 5/1925 | Davidson | 152/362 R |
| 1,981,893 | 11/1934 | Abbott | 156/422 |
| 2,874,747 | 2/1959 | Woodall | 152/362 R |
| 2,971,553 | 2/1961 | Woodall | 152/362 R |
| 3,612,137 | 10/1971 | Guyot | 152/362 R |
| 3,861,442 | 1/1975 | Bertrand | 152/362 R |
| 3,949,800 | 4/1976 | Lejeune | 152/362 R |
| 4,216,814 | 8/1980 | Grosch et al. | 152/362 R |
| 4,290,471 | 9/1981 | Pfeiffer | 152/362 R |
| 4,321,957 | 3/1982 | Hahn et al. | 152/362 R |
| 4,376,458 | 3/1983 | Lejeune | 152/362 R |

FOREIGN PATENT DOCUMENTS 2412986 10/1975 Fed. Rep. of Germany .
2123360 2/1984 United Kingdom .

*Primary Examiner*—Lois E. Boland
*Attorney, Agent, or Firm*—L. R. Drayer

[57] ABSTRACT

A pneumatic tire and a method of constructing a tire bead for the same, in which the tire has a bead portion which is reinforced by a bead core of wire running around the bead portion and the wire is housed in a circular elastomeric support which forms a cradle in which the wire is located. The bead can be made by winding wire around the preformed elastomeric cradle.

2 Claims, 4 Drawing Figures

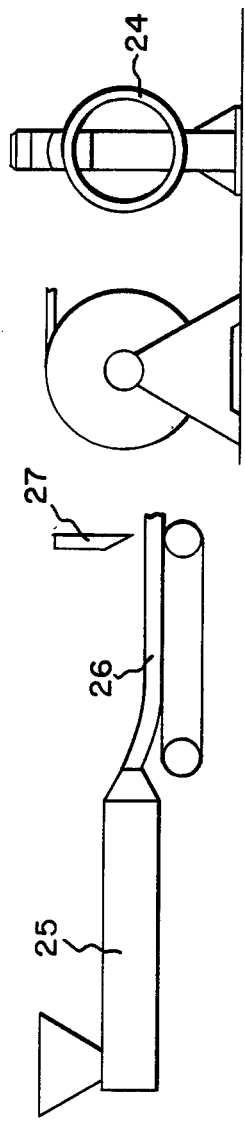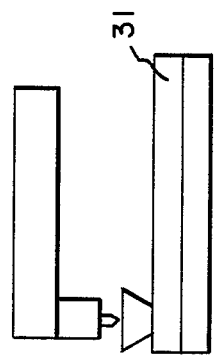

PNEUMATIC TIRE

This invention relates to pneumatic tires and to a method of making a tire bead, particularly for heavy duty truck tires.

A typical tire has a bead core which is manufactured by coating wire in rubber compound and winding the wire on a die to form a hoop of bundled together wire, the bundle typically having a generally hexagonal, a generally round or a generally square cross-section and being known in the trade as a bead bundle. Sometimes the bead bundle is held in shape by spirally winding a wrapping cord around the outside of the bundle. However, the bead bundles may become distorted during the manufacture of a tire, for example, the cross-section of the bead core in the tire may be altered from being square to become rhomboid during the tire building.

The present invention seeks to provide a means of constructing a more stable tire bead assembly.

Accordingly there is provided a method of making a tire bead assembly including the step of forming a substantially circular support of elastomeric material and which has a substantially 'U'-shaped radial cross-section having the channel therein directed radially outwardly of the circular support, and then combining said support with a bead core comprising a plurality of turns of wire bundled together, so as to lodge the bead core within the channel.

Also according to the invention there is provided a pneumatic tire having a bead portion for seating on a wheel rim, said bead portion being reinforced by a bead core of wire extending circumferentially around the bead portion, said wire being housed within a circular elastomeric support which extends around the bead core and which forms a cradle in which the wire is located.

Preferably the cradle support has a substantially 'U'-shaped radial cross-section and the wire is lodged within the arms of the 'U'.

DESCRIPTION OF DRAWINGS

The invention will be described by way of example and with reference to the accompanying drawings in which:

FIG. 3 is a schematic representation of one method of manufacturing the bead assembly.

FIG. 4 is a schematical representation of and alternate method of making the cradle.

DETAILED DESCRIPTION

Figure 1:
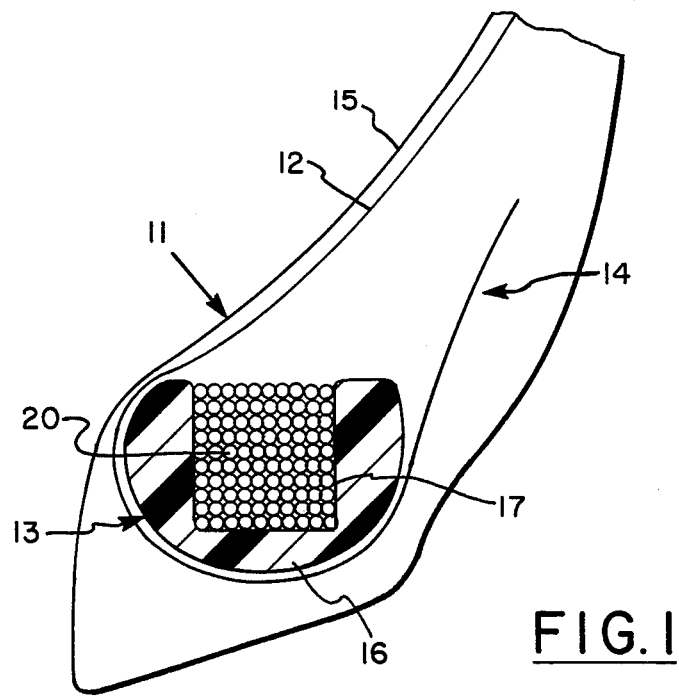
FIG. 1 is a partial radial cross-section through a bead portion of a tire according to this invention.

In FIG. 1 there is shown a radial section through the bead portion 11 of a carcass of a heavy duty pneumatic tire. The carcass is reinforced by a rubberized ply 12 of nylon or polyester cords. The reinforcing ply 12 passes around the axially inner side of a bead assembly 13 and has a ply turn up portion 14 which extends up the axially outer side of the bead area. (The terms axially inner and axially outer refer to axial position relative to the mid-circumferential plane of the tire). The bead portion has an internal surface 15 which could be lined with an air impermeable layer.

The bead assembly 13 (see FIG. 2) comprises a circular support 16 that extends continuously around the bead portion 11 of the tire and a bead core 20 of wire reinforcement 17 which also extends continuously around the bead portion. The support 16 has a substantially 'U'-shaped radial cross-section with the arms 18 of the support 16 being directed radially outwardly of the tire to provide an annular channel or recess 19 therebetween which faces radially outwardly of the circular support. The channel 19 is of a substantially square cross-section and the support 16 has an outer surface 23 which is substantially circular having a radius R struck from a point P at the center of the channel. The sides 21 and base 22 of the channel 19 each have a respective height h or width W that is substantially equal to the radius R of the outer surface 23. The channel 19 is substantially filled with the bead core 20 which comprises a single rubber coated wire 17 wound into adjacent hoops which are bundled together within the channel 19 of the support 16. Because the bead core 20 is lodged within the support, it allows for a close packing of the bead wire 17 as the bead 20 is formed by winding the wire 17 around the support 16.

In the present embodiment of the invention, the support 16 is made from an extrudable polyurethane elastomer of a hardness in the range shore A 70–100 at 20° C., a density range of 1.2–1.3 grm/cm$^3$, and a tensile strength of 300–500 kg/cm$^2$. Such a material is marketed under the trade name DESMOPAN by Bayer Chemicals.

Figure 2:
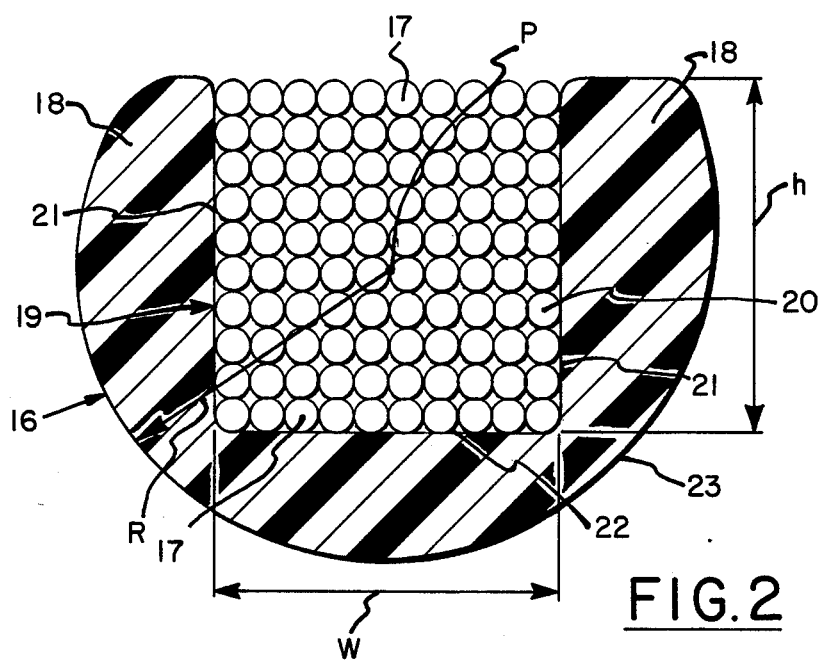
FIG. 2 an enlarged radial cross-section through a bead assembly and its support as are utilised in FIG. 1.

Now with reference to FIG. 3, the bead assembly 13 may be made as follows, the polyurethane DESMOPAN is processed in an extruder 25 and an extrudate 26 of the desired cross-section, as illustrated for the support 16 in FIG. 2, is passed through a cutter 27 and cut to length. The cut-to-length extrudate 26 is formed into a hoop-like support 24 by welding the ends of the extrudate 26 together so that the channel 19 faces radially outwards. The bead core 20 is formed by winding single filament wire 17 around the polyurethane support until the channel 19 is almost filled. The channel 19 need not necessarily be filled and a single profile could be used more than one size of tire e.g. 900 R 20 and 1000 R 20 use the same profile. The completed bead assembly 13 is then used on the tire manufacture in the conventional manner.

As an alternative to winding a single filament wire around the support, a layer comprising a plurality of parallel wire filaments could be wound into the channel around the support.

If it is necessary to improve the adhesion between the polyurethane support and the rubber of the tire carcass, the cut-to-length polyurethane extrudate 26 can be treated by leaching its surface to give some microporosity and then coating it with an adhesive for example an adhesive marketed under the tradename CHEMLOK 218 by Hughson Chemicals.

Instead of forming the polyurethane support 16 from a hooped extrudate 24 it is possible to inject or cast liquid polyurethane resin into a mold 31 having a cavity therein of the required shape. The resin cures to form a solid casting or molding. This process is called reaction injection molding. Typical cast polyurethanes are marketed as two part systems, a glycol and an isocyanate, for example VULKOLLAN and DESMODUR marketed by Bayer Chemicals.

An advantage of the tire construction described in this specification is that the increased overall dimensions of the bead assembly 13 result in the carcass reinforcing ply 12 lying closer to the natural equilibrium curve of the tire.

In another method of assembly also according to this invention, the wire is wound around a metal former to form a bead bundle, as is previously known. The preformed circular support is then deformed and snapped into place around the bead bundle utilizing the elastomeric properties of the support.

While certain embodiments and details have been shown for the purpose of illustrating the invention it will be apparent to those skilled in the art that various changes and modifications can be made therein without departing from the scope of the invention.

I claim:

1. A tire wherein the support has a radial cross-section such that the channel therein has a substantially square cross-section and the outer surface of the support has a substantially circular cross-section.

2. A pneumatic tire comprising a bead portion for seating the tire on a wheel rim, said bead portion having a bead assembly therein comprising a circular support that extends continuously around said bead portion and a bead core of wire reinforcement which also extends continuously around the bead portion, said support having a substantially U shaped radial cross section with the arms of the support directed radially outwardly of the tire to provide an annular channel therebetween which faces radially outwardly of the circular support, said bead core being disposed within said channel, said support comprising a polyurethane elastomer having a hardness of Shore A 70–100 at 20° C.

* * * * *

UNITED STATES PATENT OFFICE
CERTIFICATE OF CORRECTION

PATENT NO. : 4,557,307
DATED : December 10, 1985
INVENTOR(S) : Frank Philpott

It is certified that error appears in the above-identified patent and that said Letters Patent are hereby corrected as shown below:

Claim 1 should read:

1. A tire as claimed in claim 2 wherein the support has a radial cross-section such that the channel therein has a substantially square cross-section and the outer surface of the support has a substantially circular cross-section.

Signed and Sealed this

Second Day of September 1986

[SEAL]

Attest:

DONALD J. QUIGG

Attesting Officer    Commissioner of Patents and Trademarks

UNITED STATES PATENT OFFICE
CERTIFICATE OF CORRECTION

PATENT NO. : 4,557,307
DATED : December 10, 1985
INVENTOR(S) : Frank Philpott

It is certified that error appears in the above-identified patent and that said Letters Patent are hereby corrected as shown below: The claims are set forth below in their entirety and the numbering and dependency of the claims is corrected.

1. A pneumatic tire comprising a bead portion for seating the tire on a wheel rim, said bead portion having a bead assembly therein comprising a circular support that extends continuously around said bead portion and a bead core of wire reinforcement which also extends continuously around the bead portion, said support having a substantially U shaped radial cross-section with the arms of the support directed radially outwardly of the tire to provide an annular channel therebetween which faces radially outwardly of the circular support, said bead core being disposed within said channel, said support comprising a polyurethane elastomer having a hardness of Shore A 70-100 at 20° C.

2. A tire as claimed in Claim 1 wherein the support has a radial cross-section such that the channel therein has a substantially square cross-section and the outer surface of the support has a substantially circular cross-section.

This certificate supersedes Certificate of Correction issued September 2, 1986.

Signed and Sealed this
Eleventh Day of November, 1986

*Attest:*

DONALD J. QUIGG

*Attesting Officer*   *Commissioner of Patents and Trademarks*